United States Patent [19]

Schubert

[11] Patent Number: 5,366,949
[45] Date of Patent: Nov. 22, 1994

[54] CEBR₃ CATALYST

[75] Inventor: Paul F. Schubert, Campbell, Calif.

[73] Assignee: Catalytica, Inc., Mountain View, Calif.

[21] Appl. No.: 73,300

[22] Filed: Jun. 4, 1993

Related U.S. Application Data

[63] Continuation of Ser. No. 831,276, Feb. 4, 1992, abandoned.

[51] Int. Cl.⁵ .............................................. B01J 27/135
[52] U.S. Cl. ................................. 502/227; 423/502; 423/507
[58] Field of Search ....................................... 502/227

[56] References Cited

U.S. PATENT DOCUMENTS

| | | |
|---|---|---|
| 2,536,457 | 1/1951 | Mugdan . |
| 3,179,498 | 4/1965 | Harding et al. . |
| 3,260,568 | 7/1966 | Bloch et al. . |
| 3,273,964 | 9/1966 | De Rosset . |
| 3,310,380 | 3/1967 | Lester . |
| 3,346,340 | 10/1967 | Louvar et al. ............... 502/346 |
| 3,353,916 | 11/1967 | Lester ........................ 502/228 |
| 3,379,506 | 4/1968 | Massonne et al. . |
| 3,437,445 | 4/1969 | Hay et al. . |
| 4,131,626 | 12/1978 | Sharma et al. . |
| 5,081,290 | 1/1992 | Partenheimer et al. ..... 502/227 |

FOREIGN PATENT DOCUMENTS 930341  7/1963  United Kingdom .

Primary Examiner—Anthony McFarlane
Assistant Examiner—E. D. Irzinski
Attorney, Agent, or Firm—Morrison & Foerster

[57] ABSTRACT

This invention is a catalyst and a process using that catalyst for oxidizing hydrogen bromide to form elemental bromine. The inventive catalyst composition comprises cerium bromide on certain zirconia containing supports. The zirconia support, preferably largely in the baddeleyite phase, stabilizes the cerium bromide catalyst against cerium oxide formation at operating temperatures and gives the catalyst excellent activity at lower temperatures.

14 Claims, 5 Drawing Sheets

CEBR₃ CATALYST

This is a continuation of application Ser. No. 07/831,276 filed Feb. 4, 1992, now abandoned.

FIELD OF THE INVENTION

This invention is a catalyst and a process using that catalyst for oxidizing hydrogen bromide to form elemental bromine. The inventive catalyst composition comprises cerium bromide on certain zirconia containing supports. The zirconia support, preferably largely in the baddeleyite phase, stabilizes the cerium bromide catalyst against cerium oxide formation at operating temperatures and gives the catalyst excellent activity at lower temperatures.

BACKGROUND OF THE INVENTION

This invention is both a catalyst and a process for producing elemental bromine from hydrogen bromide using that catalyst.

Bromine is a chemical feedstock often used for the production of bromoalkanes or olefins from alkanes. Bromine is found in nature only as dilute sources such as seawater or as brine well deposits. The classic process for producing bromine from such sources involves a multistage process involving electrolyzing, chlorinating, or acidifying the brine to release elemental bromine or hydrogen bromide into a solution, aerating or steaming the resulting dilute solution, absorbing the bromine or hydrogen bromide from the aeration effluent, and distilling the resulting absorbate to recover the bromine.

It is, of course, desirable not to be placed in the position of requiring fresh bromine if another suitable bromine-containing source is available from which to produce elemental bromine. Hydrobromic acid or hydrogen bromide (HBr) is a byproduct of a wide variety of chemical processes. This invention is a process utilizing a hydrogen bromide feed in producing elemental bromine.

There are a number of processes described in the open literature which produce bromine according to the equation:

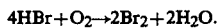

$$4HBr + O_2 \rightarrow 2Br_2 + 2H_2O.$$

One such process (British Patent 930,341) involves the conversion of hydrobromic acid solutions using dissolved metal ion catalysts. The soluble metal may be gold, cerium, chromium, nickel, platinum, thorium, titanium, or vanadium; but preferably is iron or copper. A gas containing oxygen is passed through the acidic solution containing HBr and the dissolved metal, all at a temperature below the boiling point of the liquid. The gaseous effluent is then separated via condensation and distillation into product bromine, water, and HBr for recycle to the oxidation step.

Similarly, U.S. Pat. No. 3,179,498, to Harding et al, discloses a process in which a nitrite catalyst is employed in an acidic, aqueous solution of HBr to effect the oxidation of the HBr to Br₂. The temperature of the liquid is maintained between 0° and 100° C. Although any inorganic or organic nitrite is said to be suitable, preferred catalysts are alkali metal or alkaline earth metal nitrites.

There are a number of processes which use heterogeneous catalysts to effect the conversion of HBr to Br₂.

U.S. Pat. No. 2,536,457, to Mugdan, teaches such a process. The conversion is carried out at a temperature between 800° and 1200° C. (preferably between 800° and 1000° C.) with an excess of oxygen. The catalyst is preferably cerium oxide and may be supported on pumice granules or other refractory materials. If excessive water is included in the reactor, a combustible gas such as hydrogen is included to maintain the reaction temperature. Clearly the reaction temperature for this process is quite high.

U.S. Pat. No. 3,273,964, to De Rosset, shows a process in which the effluent from a dehydrobromination reaction is contacted with a catalyst-adsorbent composite. The effluent contains olefinic hydrocarbons and is produced by a series of steps in which an alkane is brominated to form a bromoalkane; the bromoalkane is then dehydrobrominated to form the effluent of olefinic hydrocarbons and HBr. The catalyst-adsorbent composite adsorbs the HBr in a first step and, during regeneration, catalyzes the oxidation of HBr to form the desired Br₂. The composite contains an adsorbent of a basic metal oxide such as magnesium, calcium, or zinc oxide, and a catalyst of a Group IV-B metal oxide such as titania, magnesia, or zirconia. The preferred composite contains magnesia and zirconia in a ratio from about 0.5:1 to about 5:1.

U.S. Pat. No. 3,260,568, to Bloch et al, teaches a process it, which a stream containing substantially dry HBr with a solid adsorbent containing a metal "subchloride" and which is the reaction product of a refractory metal oxide and a metal chloride. The contact takes place at conditions where the HBr replaces at least a portion of the chloride in the adsorbent. When the adsorbent has reached about six percent by weight, the adsorbent is regenerated by contacting it with a dry hydrogen chloride gas. The patent does not appear to suggest the conversion of the adsorbed HBr to Br₂. The adsorbent is suggested to be selected from metal chlorides such as aluminum, antimony, beryllium, iron, gallium, tin, titanium, and zinc chlorides.

U.S. Pat. No. 3,310,380, to Lester, discloses a process for the adsorption of combined bromine (e.g., HBr and alkyl bromides) on a catalytic-adsorbent composite, recovering unsaturated hydrocarbons, and when the adsorbent is filled, contacting the composite with an oxygen-containing gas at a temperature between 50° and 450° C. to produce a Br₂ stream also containing water and unreacted HBr. This stream (also in admixture with an oxygen-containing gas) is then contacted with a second stage reactor also containing the composite but at a temperature between 200° and 600° C. The composite in the first stage comprises, preferably, 0.5 to 10% by weight of copper or cerium oxide composited on magnesium oxide: the second stage composite comprises, preferably, 2.0 to about 50% by weight of copper or cerium oxide composited on an alumina or zirconia support.

Similarly, U.S. Pat. No. 3,346,340, to Louvar et al, suggests a process for the oxidation of HBr to Br₂ using a catalyst-inert support composite. The composite comprises a copper or cerium oxide on an inert support having a surface area between 5 and 100 square meters per gram and containing less than about 50 micromoles of hydroxyl per gram. The supports may be alpha- or theta-alumina or zirconia. The preferred temperature is between 300° and 600° C.

U.S. Pat. No. 3,353,916, to Lester, discloses a two stage process for oxidizing HBr to form Br₂ by the steps of mixing the HBr-containing gas with an oxygen-containing gas and passing the mixture at a temperature of at least 225° C. over a catalyst selected from the oxides and salts of cerium, manganese, chromium, iron, nickel, and cobalt and converting a major portion of the HBr to Br₂. The partially converted gas, still containing excess oxygen, is then passed through a second stage catalyst comprising a copper oxide or salt at a temperature of at least about 225° C. but not exceeding a "catalyst peak temperature" of 350° C. to convert the remaining HBr. The preferred support appears to be zirconia.

This two-stage arrangement is carried out to prevent loss of the copper catalyst. Because the preferred copper oxide is apparently converted to copper bromide during the course of the reaction and copper bromide volatilizes at "temperatures in excess of about 350° C.", the "copper bromide migrates through the catalyst mass in the direction of flow with eventual loss of copper bromide and premature deactivation." Use of a first catalyst stage which is tolerant of high temperatures, although apparently not as active a catalyst as is copper, allows a cooler second catalyst stage containing copper to complete "quantitative conversion of bromine from hydrogen bromide."

U.S. Pat. No. 3,379,506, to Massonne et al, teaches a process for the selective oxidation of hydrogen bromide to bromine in the presence of fluorocarbons by passing the mixture of gases over a Deacon catalyst at a temperature of 250° to 500° C., preferably between 300° and 400° C. The Deacon catalyst is said to be a "mostly porous carrier such as pumice, alumina, silica gel, clay, or bentonite, impregnated with a solution of bromides or chlorides of metals such as copper, iron, titanium, vanadium, chromium, manganese, cobalt, molybdenum, tungsten, or mixtures thereof." The preferred catalyst is said to be a chloride of copper. The patent notes that:

"[a] very efficient and stable catalyst is an oxidation catalyst which is prepared by impregnating active alumina with chlorides of copper, rare earths and/or alkali metals, drying at about 120° C. and subsequent activation at a temperature of 300° to 450° C."

One example shows the production and use of a catalyst of alumina, potassium, copper, and an amount of "rare earths of the cerite group as chlorides".

Another patent which notes the problem with the volatilization of copper bromide in the oxidation of hydrogen bromide to bromine is U.S. Pat. No. 3,437,445, to Hay et al. The solution is to eliminate the copper in favor of a noble metal, such as platinum and palladium. The reaction is carried out at a temperature between about 175° and about 700° C. with a contact time of at least about 0.1 sec, "but for best operation a contact time of about five and 25 seconds is preferred." The yield of bromine is only between 28 and 78 molar percentage.

U.S. Pat. No. 4,131,626, to Sharma et al, suggests a process in which bromide salts are heated in the presence of an oxygen-containing gas, silicon dioxide, and an oxidation catalyst at a temperature of about 500° to 1000° C. The bromine is produced in conjunction with sodium silicate.

None of these documents suggest a catalytic HBr oxidation process in which the catalyst comprises cerium bromide on a zirconia support. Furthermore, none of those disclosures show a process in which the cerium bromide is as stable nor produces Br₂ in as efficient a yield as is done by our process.

SUMMARY OF THE INVENTION

This invention is a catalyst and a process for oxidizing hydrogen bromide to form elemental bromine using that catalyst. The catalyst composition comprises cerium bromide on a zirconia containing support. The cerium bromide is applied to the zirconia support, the support is preferably largely in the form of baddeleyite, so that no further treatment is typically required when introducing the catalyst into service. The catalyst has several definitional physical/chemical descriptors allowing identification of the catalyst.

In the inventive process, hydrogen bromide is vaporized and mixed with an oxygen-containing gas and heated to a temperature between 125° C. and 350° C. or more. The heated gas mixture is passed over the catalyst at conditions suitable for the formation of bromine. The bromine may then be separated from the co-produced water.

DESCRIPTION OF THE INVENTION

Figure 1:
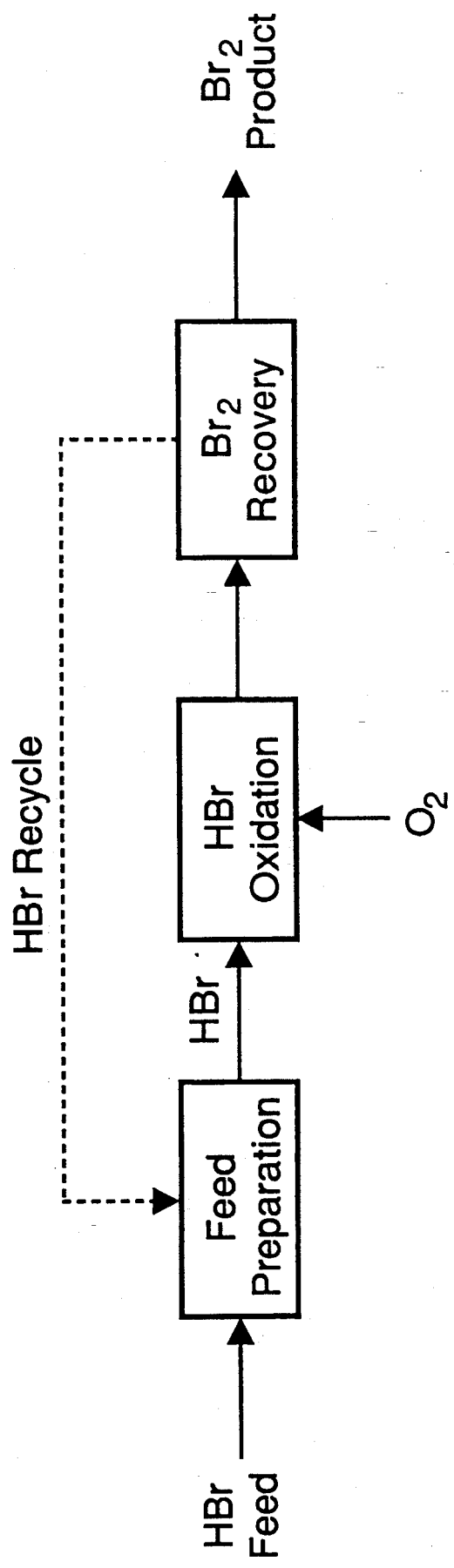
FIG. 1 shows a block diagram of a generic embodiment of the inventive process.

As noted above, this invention is a catalyst composition and a process for oxidizing hydrogen bromide with an oxygen-containing gas to form elemental bromine using that catalyst composition according to the equation:

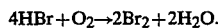

$$4HBr + O_2 \rightarrow 2Br_2 + 2H_2O.$$

The catalyst comprises cerium bromide on a zirconia containing support.

The Catalyst

The catalyst of this invention is exceptionally stable both at the preferred temperatures of operation and higher. Unlike the catalysts of the prior art, the active cerium bromide does not substantially migrate from the catalyst composition nor among different regions of the catalyst. The catalyst is very active across a wide band of operation. It is significantly more active at lower temperatures than the either the cerium- or copper-based catalysts of the prior art. The exceptionally high activity of the catalyst composition permits the use of comparatively lower temperatures thereby enhancing, even more, the catalyst's stability.

Unlike other catalysts in this art, the inventive catalyst is produced by placing cerium bromide directly onto the support, and is not made by converting another cerium-bearing material into cerium bromide on the support during use. Although we believe that the direct addition of the cerium bromide to the support is critical to the stability and activity of the catalyst, we do not wish to be bound to that theory. Finally, although the support most desirably comprises a substantial portion of baddeleyite-phase zirconia, inclusion of other material (e.g., cubic phase zirconia, hafnia, alumina, titania, yttria, silica, thoria, and other oxidic supports) is suitable although overall catalyst operation has not been seen to be as good.

Specifically the catalyst is a composite comprising or desirably consisting essentially of cerium bromide and a major amount of a baddeleyite phase zirconia-containing catalyst support, optionally intermixed with one or more catalyst binders.

The cerium bromide should be present in at least a catalytic amount, that is to say, an amount sufficient at least to catalyze the reaction of HBr and oxygen to produce $Br_2$. We have found that cerium content in the amount of 0.01 to 1 mmoles-Ce/g of the overall composition is desirable; 0.2 to 0.6 mmoles-Ce/g of the overall composition is more desirable; and 0.3 to 0.6 mmoles-Ce/g of the overall composition is most desirable.

We have found that the introduction of the cerium catalyst onto the catalyst support in the form of cerium bromide results in a catalyst composition which is both more stable and more active than compositions in which the catalyst is introduced in another form, such as by the oxide. We have additionally found that the x-ray diffraction spectrum ($Cu_\alpha$) of the catalyst composition does not show the presence of crystalline $CeBr_3$. Specifically, the x-ray diffraction spectrum of crystalline $CeBr_3$ contains the following lines:

| $2\theta$ (°) | $I/I_o$ |
|---|---|
| 33.153 | 1.0 |
| 62.539 | 1.0 |

The absence of these distinctive lines demonstrates the substantial absence of cerium bromide crystallinity.

The zirconia support typically will contain a major amount, e.g., more than about 50% (wt) of zirconia. The crystalline structure of the zirconia is preferably tetragonal, i.e., in the baddeleyite form. A minor amount of other metal oxides, e.g., cubic zirconia, alumina, titania, hafnia, yttria, silica, thoria, etc., may be included as a binder or extrusion aid or to increase surface area if so desired; but again, the preferred form is the baddeleyite phase if all of the various benefits of the catalyst are to be enjoyed.

We have found that it desirable to use a zirconia support having significant porosity in the range between 30 and 600 Å, e.g., >0.01 cc/g pore volume in the range of 30 and 600 Å pore diameter and even more preferred to have >0.01 cc/g pore volume in the range of 30 and 100 Å pore diameter. The catalyst support material may be utilized in any physical form convenient to the process in which it is utilized. Such forms may include tablets, extrudates, raschig or Pall rings, or the like. The reaction is very exothermic and consequently the relative external surface area may be an important consideration in some reactor/process configurations.

We have also observed that the most preferred form of the catalyst, $CeBr_3$ on a neat $ZrO_2$ support, does not exhibit a phase transition in the range of 720°-770° C. when a thermogravimetric analysis is performed on the catalyst composition. Catalysts prepared using prior art methods often show this phase transition.

The catalyst desirably is prepared by dissolving appropriate cerium compounds or complexes independently in aqueous HBr solutions and impregnating them into the zirconium-containing catalyst supports. The zirconium-containing catalyst supports should be dried at, e.g., 100° to 300° C. in air, before impregnation so to allow accurate measurement of the metal content added to the support. The method and sequence of impregnating the support has not been found to be critical. Depending upon the impregnating procedure chosen, the solutions may be saturated or not. If an incipient wetness method is selected, the amount of solution will match the pore volume of the support requiring that the composition of the solution be adjusted to assure that the amount of metal added to the support is appropriate. If other procedures are elected, saturated solutions may be used and a particular amount of the solutions chosen.

The impregnated support is dried and ready for use. The drying temperature desirably is between 100°-300° C. and is preferably 120°-200° C.

Process

The process involves the step of producing $Br_2$ by oxidizing a vaporous or gaseous HBr stream using an oxygen-containing gas in the presence of the catalyst composition discussed just above. Desirably, although optionally, the process may also comprise HBr feed preparation steps and $Br_2$ product separation steps.

FIG. 1 shows a schematic diagram of a generic embodiment of the process including the optional feed treatment and product $Br_2$ separation steps. In this process, HBr may be acquired from a variety of sources, such as a byproduct from the bromination of synthetic rubber or hydrocarbons or from other bromide salts or directly from natural sources such as seawater or salt or saltwater deposits. The feed pretreatment steps may include any steps necessary or desirable in performing such functions as concentrating or diluting HBr to an economically appropriate level to send to the oxidizing step, cleansing the feed of hydrocarbons or impurity metals, removal of or conversion of bromide salts to HBr, and the like.

The oxidation step involves the simple expedient of mixing the gaseous or vaporous HBr from the feed preparation step with a suitable amount of an oxygen-containing gas, such as air, oxygen-enhanced air, or oxygen. The $O_2$ is desirably added in an amount producing an $HBr:O_2$ molar ratio of between about 3.25 and 4.25. The $O_2$ may be present in an excess of $O_2$ not only to assist in the HBr oxidation but also to oxidize any hydrocarbonaceous materials present in the feedstream. Nevertheless an $HBr:O_2$ molar ratio of between above 3.9 and up to 4.1 is preferred.

In any event, the $HBr-O_2$ mixture is then passed through one or more beds of the catalysts described above. As noted elsewhere, this reaction is highly exothermic. The temperature in the reactor may be controlled in a variety of ways. For instance, if an adiabatic reactor is desired, the feed HBr likely will need be diluted with steam, nitrogen, air, product stream recycle, or the like to prevent excessive temperature rise in the reactor. In other reactor configurations, some provision may be made for removing the heat of reaction, e.g., by inclusion of the bed or beds in an appropriately cooled heat exchanger (such as by tubes of catalyst in a steam generator), by adding the oxygen-containing gas in a series of steps with cooling steps amongst sequential catalyst beds, etc. The catalyst bed or beds may be fluidized or ebullated if so desired. Fluidization allows superior control of the bed temperature and prevents the occurrence of "hot-spots" in the catalyst.

The materials of construction for the reactor should be selected using normal materials criteria but bearing in mind that the system is fairly corrosive. For instance, if the reactor is operated at the lower end of the reaction range noted above and the reactor is a nickel alloy, the reactor should be maintained above the temperature of condensation lest liquid phase corrosion occur. Similarly, the upper range of temperature should be controlled to prevent vapor phase corrosion. If a ceramic system is chosen, similar criteria are applicable to prevent dissolution of the ceramic or to prevent creep of the polymeric seals used at joints and flanges.

The product separations stage includes the generic steps of quenching the reactor product, recovering and concentrating the $Br_2$, and recovering materials such as HBr for recycle.

Figure 2:
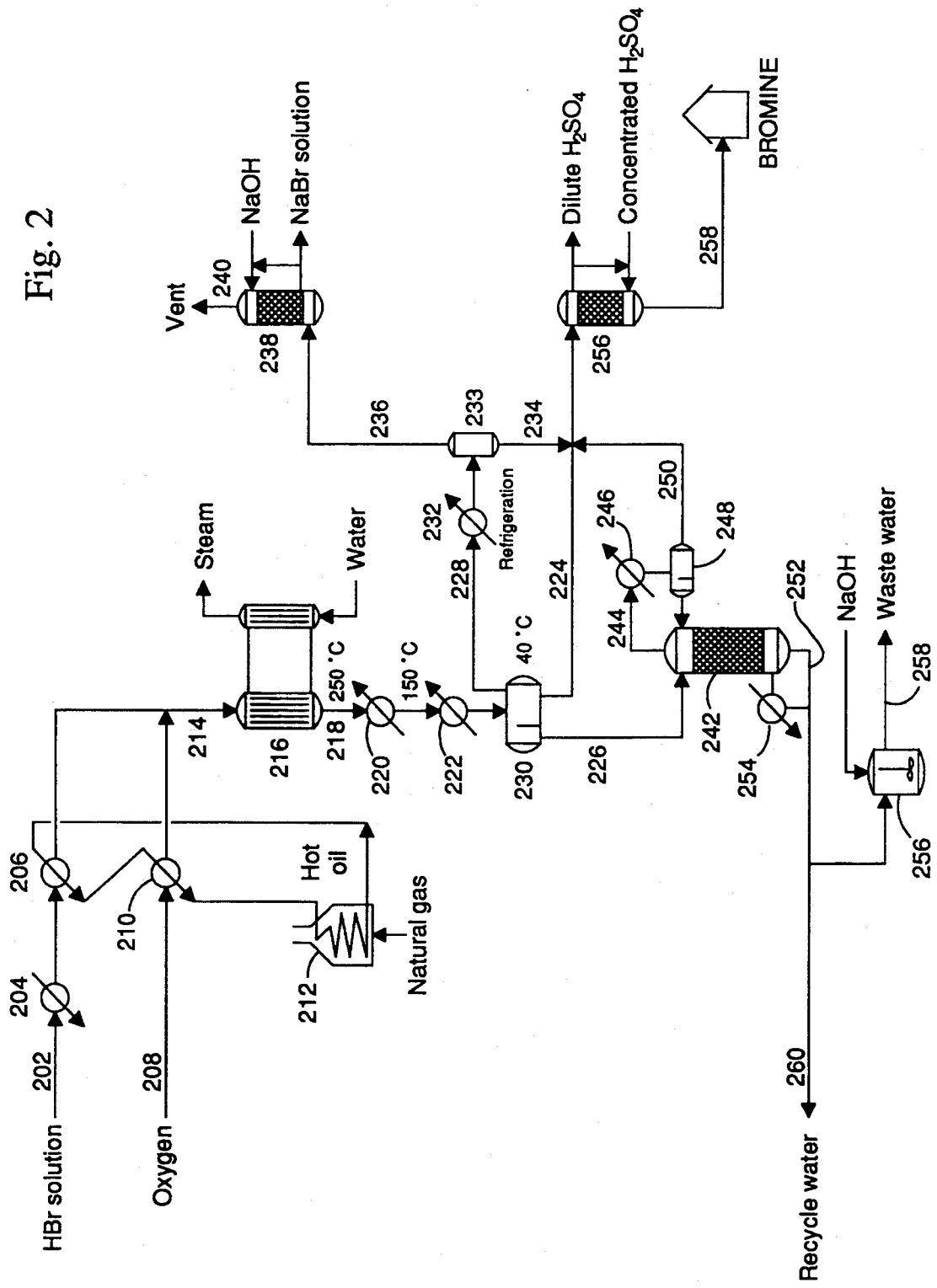
FIGS. 2 and 3 depict schematic process diagrams of preferred embodiments of this invention.
Figure 3:
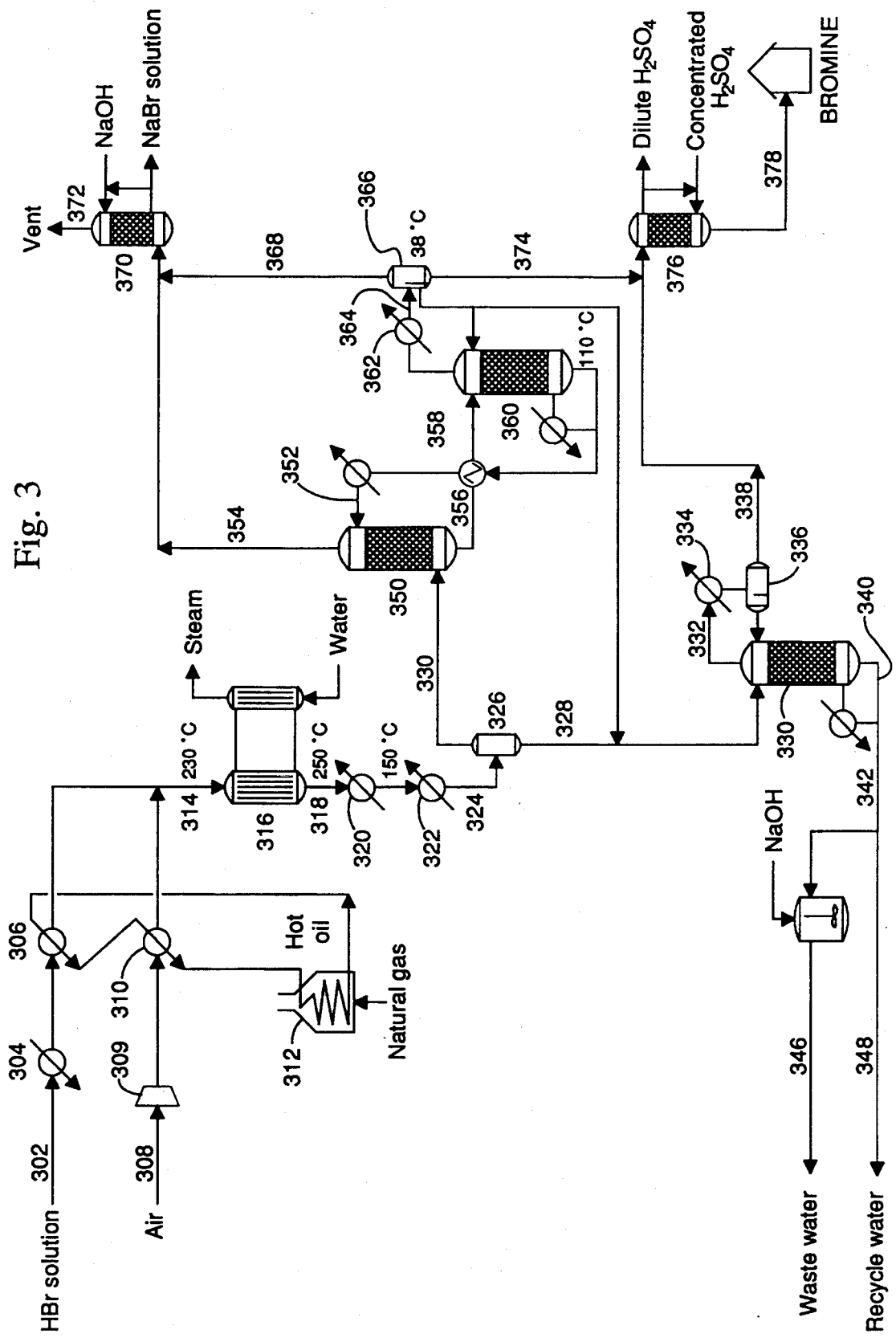

FIGS. 2 and 3 show desirable integrated processes for the oxidation of HBr to $Br_2$ using the catalyst described above. FIG. 2 shows a process using $O_2$ as the process feed; FIG. 3 shows a process diagram in which air is the process feed. The inventive process may be designed to handle intermittent or variably flowing HBr feedstreams as might be encountered if the process were used as a method of regenerating an HBr stream emanating from a batch process. The aqueous HBr streams used in the process integrate nicely between the recycle steps found in the product recovery section and the absorption steps of the feed preparation stage.

Oxygen Process

In this embodiment of the inventive process, shown in FIG. 2, an HBr stream (202) is introduced from outside the battery limits. Depending upon the source and quality of the feedstream, it may be desirable to submit the feed to preliminary treatment. For instance, if the feed contains HCl, it may be treated in the feed pretreatment section to remove the HCl or the HCl may pass through the remainder of the operational steps and be removed in the bromine recovery section. If the stream is not pure or if the selected process design so requires, the feedstream may be treated using known techniques to raise or to lower the HBr concentration or to remove various inorganic and organic impurities.

In any event, the HBr feedstream (preferably of about 48% HBr in water) is sent to an evaporator (204) and to a superheater (206). The resulting HBr vapor should be at a temperature of about 230°–250° C. The oxygen feedstream (208) is similarly warmed to about 230°–250° C. with superheater (210). The heat for superheaters (206) and (210) may, for instance, be supplied by a circulating hot oil system including hot oil heater (212).

The heated HBr feedstream and the heated oxygen feedstream are then mixed to form a reactor feedstream (214) which is then introduced into reactor (216). The reactor (216) is desirably of a multi-tube design containing the catalyst described above or may be of a multi-bed design. Since the reaction is quite exothermic, reactor designs which are capable of removing the heat of reaction from the catalyst mass are obviously very desirable. The reactor design shown is also used as a steam generator.

The reaction product stream (218) may then be cooled in two stages. The first stage of cooling (220) shown is a desuperheater and merely lowers the temperature of the stream down to the neighborhood of the dew point, e.g., about 150°. This stream is then condensed and cooled to a temperature of about 40° C. in condenser (222).

The condensate is then separated into a liquid $Br_2$ stream (224) saturated with water, a water stream (226) saturated with $Br_2$, and a vaporous vent stream (228) containing unreacted oxygen, bromine, water, and a small amount of inerts. The device used for that separation (230) may be a simple phase separation device such as a decanter. Other density separation devices are just as suitable.

The vapor stream (228) is then chilled in refrigeration unit (232) to a temperature sufficient to remove most of the $Br_2$ found in the vent stream. The condensed $Br_2$ stream is separated in drum (233) and the resulting $Br_2$ stream (234) is mixed with $Br_2$ stream (224) for further processing. The resulting non-condensed oxygen vapor stream (236) is scrubbed in a gas treater (238) using, for instance, sodium hydroxide remove any remaining $Br_2$ before the treated oxygen is vented (240) into the atmosphere. The vent gas treatment step may be omitted and recycled into the reactor (216) if the oxygen is of sufficient purity.

The aqueous stream (234) coming from the separator (233) is then stripped of its $Br_2$ content in a distillation column (242). Distillation column (242) produces two streams. The overhead vapor stream (244) is condensed in overhead condenser (246) and collected in reflux drum (248). The reflux drum (248) is a decanter design. The lighter phase is largely water and is recycled to the distillation tower (242) as reflux. The heavier phase is $Br_2$ and the stream (250) is mixed with other $Br_2$ streams, (224) and (234), for further treatment such as by drying with strong $H_2SO_4$ in a countercurrent absorption tower (256). The tower produces a weaker $H_2SO_4$ stream and the desired $Br_2$ product stream (258).

The bottom stream (252) from distillation tower (242) is partially reboiled in reboiled in reboiler (254). The remainder of the stream is mostly water containing unconverted HBr feed and the water of reaction formed in the reactor (216). All or a portion of this stream may be treated by neutralization with, e.g., caustic soda, to produce a waste water stream (258). If the inventive process is used as an integrated portion of a process which is capable of using a dilute HBr, then dilute HBr stream may be so recycled.

There are other ways of eliminating the water produced in the reactor. For instance, by operating separator (232) at different conditions, e.g., at a temperature above 40° C., the overhead stream (236) will contain the water of reaction.

Air Process

The process may also be operated using a less concentrated oxygen feedstream, e.g., air or oxygen-enriched air. This variation is shown in FIG. 3.

In a general sense, the process scheme is similar to that used in the oxygen process described above. The reactor and condensation sections are identical.

As above, an HBr feedstream is sent to an evaporator (304) and to a superheater (306). The air feedstream (308) is compressed in compressor (309) and heated in superheater (310). The heat for superheaters (306) and (310) may, for instance, be supplied by a circulating hot oil system including hot oil heater (312).

The heated HBr feedstream and the heated oxygen feedstream are then mixed to form a reactor feedstream (314) which is then introduced into reactor (316). The reactor (316) is desirably of a design similar to that described above although because of the additional diluent in the feedstream is a little less sensitive to reactor design, but those which are capable of removing the heat of reaction from the catalyst mass are obviously very desirable.

The reaction product stream (318) may then be cooled in two stages. The first stage of cooling (320) shown is a desuperheater and lowers the temperature of the stream down to the neighborhood of the dew point, e.g., about 150°. This stream is then condensed and cooled to a temperature of about 40° C. in condenser (322).

The condensed reactor product stream (324) is fed to a phase separator (326) where it is separated into an aqueous stream (328) saturated in $Br_2$ and containing any unconverted HBr and an overhead vapor stream (330) containing all of the $Br_2$.

The aqueous stream (328) may be treated in a manner similar to that discussed above. The aqueous stream (328) coming from the separator (326) is stripped of its $Br_2$ content in a distillation column (330). Distillation column (330) produces an overhead vapor stream (332) which is condensed in overhead condenser (334) and collected in reflux drum (336). Water from the drum is recycled to the distillation tower (330) as reflux. The $Br_2$ stream (338) is mixed with other $Br_2$ streams for further treatment such as drying.

The bottom stream (340) from distillation tower (330) is reboiled. The stream is mostly water and contains unconverted HBr feed and the water of reaction formed in the reactor (316). All or a portion of this stream (342) may be neutralized to produce a waste water stream (346) or recycled via line (348).

Returning to the phase separator (326), the overhead vapor stream ($N_2$, $Br_2$, and $H_2O$) may be introduced into the bottom of an absorption column (350) where cold ($-15°$ C.) lean NaBr brine (352) is fed to the top to act as absorption media for $Br_2$. The overhead stream (354) is substantially free of $Br_2$.

The bottom stream (356) is heated (preferably in feed-effluent heat exchanger (358) with the heat from the bottom of stripper column (360)) and introduced into stripper column (360). In that column, $Br_2$ is stripped from the NaBr brine into an overhead stream (362). That steam is condensed in exchanger (364) and collected in reflux vessel (366). The water stream is decanted in reflux vessel (366) and is both used as reflux in stripper tower (360) and in feed to distillation tower (330).

The vapor line (368) from the reflux drum (366) may be mixed with the overhead vapor stream (354) from absorber (350) and treated by neutralization in absorber (370) to remove any remaining HBr before disposing of the $N_2$ via vent (372).

The decanted $Br_2$ (374) from reflux vessel (366) may be mixed with the $Br_2$ stream (338) from reflux vessel (336) and treated with concentrated $H_2SO_4$ in absorber (376) to remove water and produce the dry product $Br_2$.

This process is a desirable embodiment of the overall concept of the invention. There are others which are suitable for synthesizing the desired $Br_2$ product from a bromine-containing feed.

The invention has been disclosed by direct description. Below may be found a number of examples showing various aspects of the invention. The examples are only examples of the invention and are not to be used to limit the scope of the invention in any way.

EXAMPLES

Example 1

This comparative example shows the preparation of coprecipitated $CeO_2/ZrO_2$ catalyst using the method generally described in U.S. Pat. No. 3,346,340.

A catalyst sample containing nominally 9% $CeO_2$ in $ZrO_2$ was prepared in this way. A solution was prepared by dissolving 180 g of zirconyl chloride ($ZrOCl_2.8H_2O$) in 200 ml of deionized water. A second solution was prepared by dissolving 24.9 g of cerium sulfate (97% $CeSO_4$) in 200 ml of 0.5N sulfuric acid. The two solutions were quickly mixed together. A 14% ammonium hydroxide solution was then added to the mixed solutions, and a white precipitate formed immediately. The solution with precipitate was allowed to stand overnight to allow complete precipitation.

Vacuum filtration was attempted over a Whatman Qualitative 4 filter paper, but the solution plugged the paper and could not be filtered. In order to separate the solid from the liquid, aliquots were removed and centrifuged. The liquid was then decanted from the centrifuged material. A 0.35% ammonium nitrate solution was added to the centrifuge tube, and the liquid decanted again. The solids were removed from the centrifuge tube, and washed twice with 600 ml aliquots of 0.35% ammonium nitrate solution.

The solids were dried at 120° C. for 20 hours, producing a white solid. The solid was crushed and sieved to produce a 20 to 30 mesh fraction. This fraction was placed in a furnace at room temperature. The temperature was increased at 50° C./min and then held at 600° C. for 2 hours. After 2 hours, the oven was cooled, and the sample was removed to cool in air. The crystalline phases were determined using a Scintag Inc. XDS 2000 X-ray diffractometer. This analysis showed that the predominant zirconia phase was a cubic phase, with some tetrahedral zirconia (baddeyelite) also present. The mercury pore size distribution of this catalyst was determined using a Micrometrics Autopore II 9220 porosimeter. The catalyst has )0.002 cc/g porosity in the range of 30–100 Å diameter pores, and no measurable porosity in the range of 30–100 Å. The total mercury porosity (30 Å to 1 mm) was 0.2186 cc/g. This catalyst is designated Catalyst A. Catalyst A is not a catalyst according to this invention.

Example 2

This example shows the preparation of catalysts (Catalysts B–E) according to our invention.

A solution of cerium bromide was prepared by dissolving 2.9282 g of $CeBr_3$ in a 1M HBr solution to produce a final volume of 2.85 cc. The resulting solution was added dropwise onto 10.0 g of porous zirconia tablets having about 0.29 cc/g total water pore volume. The tablets contained only tetrahedral zirconia (baddeyelite) as identified by X-ray diffraction. The material was dried 16 hours at 130° C. This material was designated Catalyst E.

Catalysts of varying $CeBr_3$ loading were prepared using the same technique, but varying the amount of $CeBr_3$ added to the zirconia support. These catalysts are also listed in the Table I.

Example 3

This example shows the use of these catalysts in the production of $Br_2$.

Catalysts A through E were tested for their ability to convert HBr to $Br_2$ in a range of temperatures. A 1 cm OD by 45 cm long glass reactor tube is filled to about its center with glass beads. A glass wool plug was placed on top of the glass beads. About 1 cc of catalyst was placed on the glass wool. Another glass wool plug was placed over the catalyst bed. The remainder of the glass tube was packed with glass beads. The glass reactor was then placed in a tube furnace with an aluminum sleeve between the outer reactor wall and the inner wall of the furnace to aid in heat distribution. A thermocouple ran from the top of the reactor to the center of the catalyst bed. A 48% HBr solution was delivered to the reactor at a rate of 6 cc/hr using a syringe pump. Oxygen was fed to the reactor using a mass flow controller at 6.5 cc/min. The reaction products and unreacted feed materials were condensed in traps containing KI.

In the traps, the $Br_2$ formed reacts with the KI to form 13–. The 13– was then titrated with $Na_2SO_3$. The amount of bromine formed in the reactor was calculated from the titration results. The reactor effluent was collected in the traps, measured at various time intervals, and the reaction rates calculated for each of the three samples. After the test run was complete, the catalyst, glass wool plugs, and glass beads were removed and stored for further analysis.

The measured catalyst performance is given in the Table I. Each of the catalysts were active at 275° C. except Catalyst A. At 275° C., Catalyst A showed no activity within our ability to measure catalyst activity. The prior art, U.S. Pat. No. 3,346,340, suggests that high temperatures are needed to convert catalysts of the type of Catalyst A to an active form. Therefore, Catalyst A was tested at 400° C. to ensure that Catalyst A was tested at conditions where the prior art indicated it should be active. At 400° C., the $CeO_2$ catalyst required a considerable induction period before it reached a consistent level of activity. After 2 hours the bromine production rate for Catalyst A was only 0.7 μmoles/cc/sec. This increased to about 1.6 μmoles/cc/sec after 20 hours on stream.

Catalysts containing $CeBr_3$, at all loadings, were more active than the prior art $CeO_2$-based catalyst. Catalysts containing $CeBr_3$ in excess of 0.2 mmoles-$CeBr_3$/cc-$ZrO_2$ were more active than the CuO based catalyst.

Example 4

This example determined whether the active metals in the catalysts produced above, migrate from the support or are stable.

The glass wool plug and the glass beads downstream of each catalyst bed were analyzed using scanning electron microscopy for the presence of copper or cerium.

The elements present on the glass wool and glass beads were compared with the elements present prior to testing in the reactor. The glass wool and beads downstream of Catalyst A exhibited the presence of Ce after completion of the reaction. Loss of Ce from these catalysts would eventually cause activity loss for the catalyst, and contaminate equipment downstream. The glass wool and beads downstream of Catalysts B through E did not show any Ce after the reaction. The results of these analyses are tabulated in the Table I.

Example 5

Figure 4:
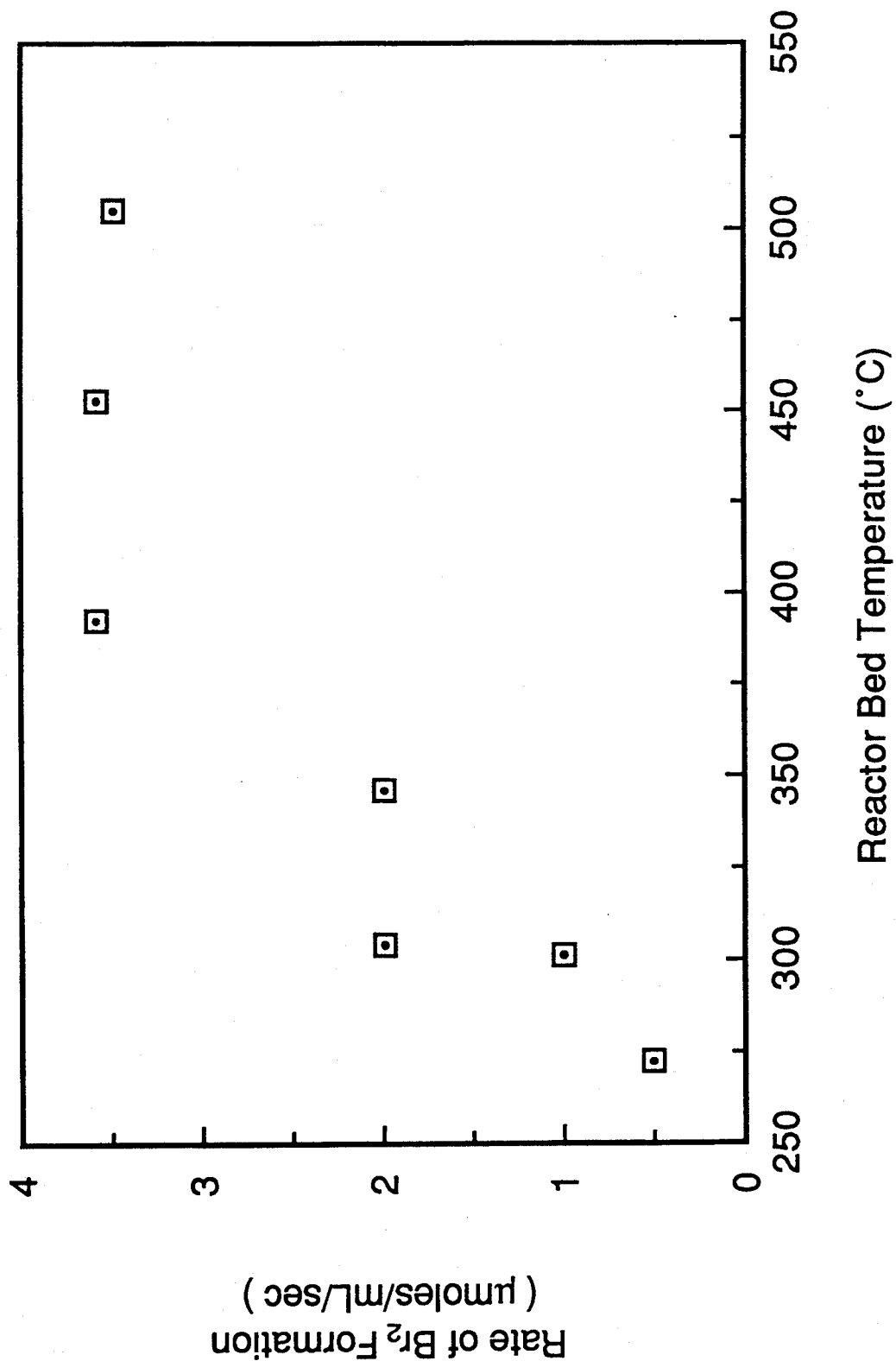
FIG. 4 shows the reaction rate for a desired catalyst as a function of temperature.

This example shows the activity of Catalyst B as a function of temperature. The procedure utilized was that of Example 3, except 2 cc of catalyst was used instead of 1 cc. The reactor bed temperature was varied from 270° C. to 500° C. The results are shown in FIG. 4. The rate appears to reach a maximum at about 400° C. This is true because for about 2 cc of catalyst, rates of about 3.5 μmoles/cc/sec represent essentially complete conversion of the HBr feed. At 500° C., loss of the catalysts yellow color from the top of the bed, and yellow deposition on the glass wool downstream of the catalyst bed indicated migration of the promoter. No migration was observed under other reactor temperatures. This example shows that the catalysts of this invention are active and stable over a broad range of temperatures.

Example 6

Figure 5:
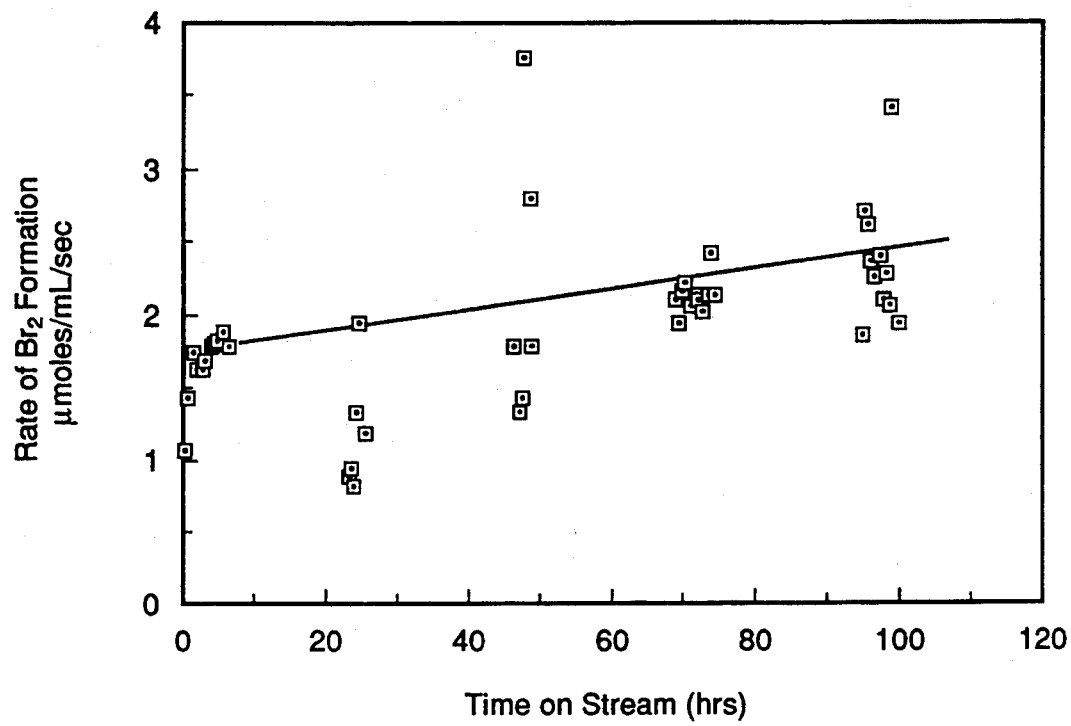
FIG. 5 is a graph showing reaction temperature as a function of time during a long term reaction test.
Figure 6:
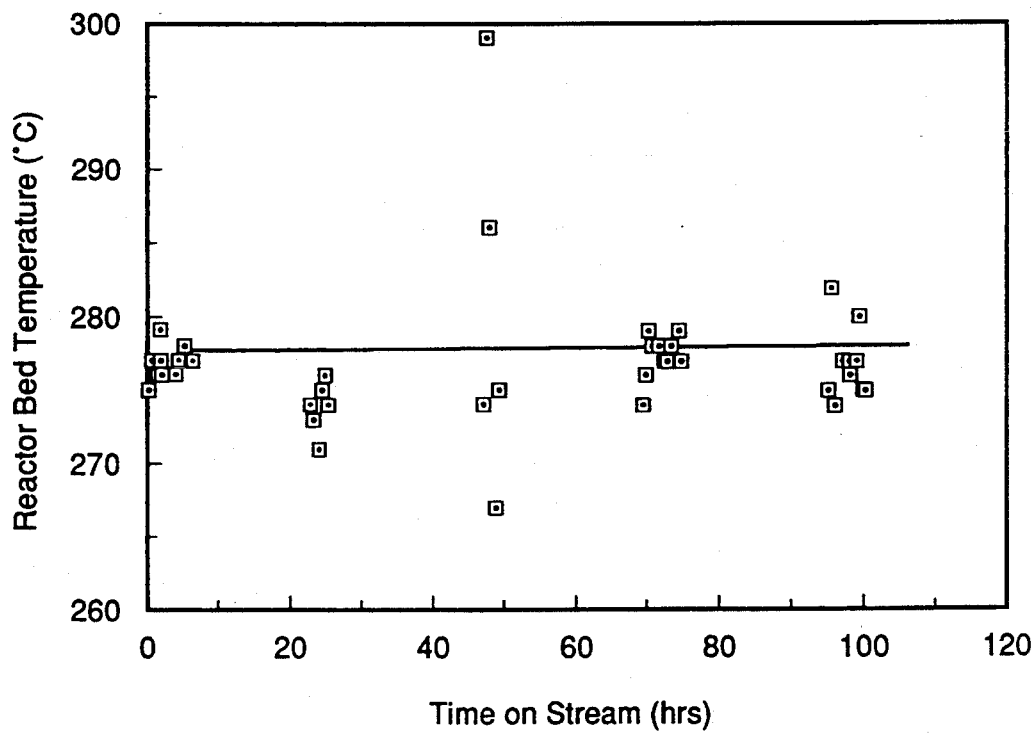
FIG. 6 is a graph showing reaction rate as a function of time during a long term reaction test.

Catalyst E was tested to determine the long term stability of the inventive catalyst. It was tested using the conditions of Example 3, except that the feedstock HBr was fed to the system for 100 hours at a nominal 275° C. bed temperature. FIGS. 5 and 6 show the temperature and reaction rate as a function of time. The catalyst did not show appreciable activity loss over the 100 hr. running time.

TABLE I

| | | Catalyst Composition and Performance | | | | | | |
|---|---|---|---|---|---|---|---|---|
| Cat. No. | Compos. | $ZrO_2$ phase[1] | Conc.[2] | T° (C.) | Rate[3] | migration | Porosity[4] Å 30–100 | Porosity[4] Å 100–600 |
| A(1) | $CeO_2$ | T, C | 0.52 | 400 | 1.58 | No | 0.002 | 0.000 |
| A(2) | $CeO_2$ | T, C | 0.52 | 275 | 0.02 | Yes | 0.002 | 0.000 |
| B | $CeBr_3$ | T | 0.20 | 275 | 0.50 | No | — | — |
| C | $CeBr_3$ | T | 0.30 | 275 | 1.53 | No | 0.048 | 0.094 |
| D | $CeBr_3$ | T | 0.45 | 275 | 4.64 | No | — | — |
| E | $CeBr_3$ | T | 0.60 | 275 | 1.72 | No | .061 | 0.101 |

[1] T = tetragonal (Baddeyelite) and C = Cubic crystalline structures
[2] Active catalyst (mmoles/g-$ZrO_2$)
[3] Rate of $Br_2$ production (μmoles/cc/hr)
[4] in cc/gm

Example 5

Several catalysts were analyzed using thermogravimetric analysis (TGA) to determine whether weight losses, often associated phase changes or other heat-producing or heat-absorbing changes occur within the catalyst composition.

Samples of the fresh and the spent prior art Catalyst A were as well as the fresh and the spent inventive Catalyst E were analyzed using a Setaram TG-DSC 111 and Cahn TG-131 thermogravimetric analyzers. Catalysts A(1) and A(2) were analyzed after they had been on stream for 20 hours. Similarly Catalyst E was analyzed both as a fresh catalyst and after 100 hours on-stream.

TABLE II

| Catalyst | Condition | 210° C. transition? | 720–770° C. transition? | 800° C. transition? |
|---|---|---|---|---|
| A | fresh | no | yes | no |
| A | 275°-spent | yes | yes | yes |
| A | 275°-spent | yes | yes | yes |
| E | fresh | yes | no | no |
| E | 275°-spent | yes | no | no |

The results (shown in Table II) showed distinct differences among the samples tested. Three transitions were of particular interest:

a.) a weight loss at about 210° C.—corresponding to the conversion of $CeBr_2$ to $CeBr_2$, b.) a weight loss at about 720°–770° C. apparently corresponding to a $ZrO_2$ phase change, and c.) a weight loss at 800° C. corresponding to the conversion of $CeBr_2$ to $CeO_2$.

Each of the used prior art Catalysts A showed each of the noted transitions. The fresh Catalyst A exhibited only the 720°–770° C. transition. This shows that the $CeO_2$ component in the prior art catalyst forms some $CeBr_3$ in use. Our inventive catalyst showed a transition only at 210° C. The absence of a transition point at the 720°–770° C. indicates that the cerium bromides on the baddeleyite $ZrO_2$ are stabilized, but those formed in situ on the prior art catalyst are in some other form and are not stable. These data also show that the $CeO_2/ZrO_2$ prior art catalyst is less stable.

It should be clear that one having ordinary skill in this art would envision equivalents to the catalysts and processes found in the claims that follow and that those equivalents would be within the scope and spirit of the claimed invention.

We claim as our invention:

1. An HBr oxidation catalyst composition comprising cerium bromide present in at least a catalytic amount and a baddeleyite phase zirconia-containing catalyst support.

2. The catalyst composition of claim 1 in which the overall cerium content of the composition is within the range of about 0.1 to 1.0 mmoles Ce/g of the overall composition.

3. The catalyst of claim 2 in which the overall cerium content of the composition is within the range of about 0.2 to 0.6 mmoles Ce/g of the overall composition.

4. The catalyst of claim 3 in which the overall cerium content of the composition is within the range of about 0.3 to 0.6 mmoles Ce/g of the overall composition.

5. The catalyst composition of claim 1 having an x-ray diffraction graph with substantially no peak at $2\theta = 33.153°$ or $62.539°$.

6. The catalyst of claim 1 where the porosity of the zirconia is greater than 0.01 cc/g for pores with diameters between 30 and 600 Å.

7. The catalyst composition of claim 1 where the composition shows substantially no thermogravimetric analysis transition at 720°–770° C.

8. The catalyst composition of claim 1 where the composition additionally contains a minor amount of one or more materials selected from the group consisting of cubic zirconia, alumina, silica, thoria, and other oxidic support materials.

9. An HBr oxidation catalyst composition consisting essentially of:

a. cerium bromide in an amount such that the overall cerium content of the composition is within the range of about 0.2 to 0.6 mmoles Ce/g of the overall composition, and b. a baddelleyite zirconia catalyst support.

10. The catalyst composition of claim 9 in which the overall cerium content of the composition is within the range of about 0.3 to 0.6 mmoles Ce/g of the overall composition.

11. The catalyst composition of claim 10 where its x-ray diffraction graph shows substantially no peak at $2\theta = 33.153°$ or $62.539°$.

12. The catalyst composition of claim 9 where the porosity of the zirconia is greater than 0.01 cc/g for pores with diameters between 30 and 600 Å.

13. The catalyst composition of claim 9 where the composition shows substantially no thermogravimetric analysis transition at 720°–770° C.

14. The catalyst composition of claim 9 where the composition additionally contains a minor amount of one or more materials selected from the group consisting of cubic zirconia, alumina, silica, thoria, and other oxidic support materials.

* * * * *